US012493090B2

United States Patent
Liu et al.

(10) Patent No.: US 12,493,090 B2
(45) Date of Patent: Dec. 9, 2025

(54) CONTROL UNIT, METHOD FOR OPERATING A CONTROL UNIT, MRT APPARATUS COMPRISING A CONTROL UNIT, COMPUTER PROGRAM AND ELECTRONICALLY READABLE DATA MEDIUM

(71) Applicant: Siemens Healthineers AG, Forchheim (DE)

(72) Inventors: Wei Liu, Erlangen (DE); Daniel Nicolas Splitthoff, Uttenreuth (DE); Florian Maier, Buckenhof (DE); Thomas Vahle, Nuremberg (DE); Heiko Meyer, Uttenreuth (DE)

(73) Assignee: Siemens Healthineers AG, Forchheim (DE)

( * ) Notice: Subject to any disclaimer, the term of this patent is extended or adjusted under 35 U.S.C. 154(b) by 71 days.

(21) Appl. No.: 18/520,434

(22) Filed: Nov. 27, 2023

(65) Prior Publication Data

US 2024/0183919 A1 Jun. 6, 2024

(30) Foreign Application Priority Data

Dec. 2, 2022 (EP) .................................... 22211132

(51) Int. Cl.
*G01V 3/00* (2006.01)
*G01R 33/54* (2006.01)
(Continued)

(52) U.S. Cl.
CPC ....... *G01R 33/543* (2013.01); *G01R 33/5608* (2013.01); *G06T 11/005* (2013.01); *G06T 11/008* (2013.01); *G06T 2211/464* (2023.08)

(58) Field of Classification Search
CPC .............. G01R 33/287; G01R 33/4835; G01R 33/5608; A61B 2090/374
(Continued)

(56) References Cited

U.S. PATENT DOCUMENTS

2007/0249928 A1   10/2007  Blezek et al.
2018/0276802 A1 *  9/2018  Lichy ........................ G06T 5/92
(Continued)

FOREIGN PATENT DOCUMENTS

| CN | 109886968 A | * | 6/2019 | |
| EP | 3680681 A1 | * | 7/2020 | ........... G01R 33/543 |
| JP | 2010057149 A | * | 3/2010 | ............. G09G 3/006 |

OTHER PUBLICATIONS

Esser M. et al.: "Performance of an Automated Workflow for Magnetic Resonance Imaging of the Prostate Comparison with a Manual Workflow", Investigative Radiology, 2020; 55: 277-284.
(Continued)

*Primary Examiner* — Walter L Lindsay, Jr.
*Assistant Examiner* — Frederick Wenderoth
(74) *Attorney, Agent, or Firm* — Banner & Witcoff, Ltd.

(57) ABSTRACT

The disclosure relates to receiving a provisioning request for providing a magnetic resonance tomography (MRT) image of a geometric image region of an object, wherein the provisioning request comprises a specification relating to at least one feature that is to be matched between an MRT reference image of the image region and the MRT image. A control unit is configured to actuate and control an MRT apparatus according to the specification in accordance with a predefined measurement technique to conduct a predefined MRT measurement at least on the geometric image region of the object, and to receive an MRT dataset generated in the measurement. The control unit is configured to provide the MRT image of the geometric image region of the object
(Continued)

according to the specification from the MRT dataset in accordance with a predefined exporting method.

17 Claims, 4 Drawing Sheets

(51) Int. Cl.
  *G01R 33/56* (2006.01)
  *G06T 11/00* (2006.01)
(58) Field of Classification Search
  USPC .......................................................... 324/309
  See application file for complete search history.

(56) References Cited

U.S. PATENT DOCUMENTS

| | | |
|---|---|---|
| 2020/0294282 A1 | 9/2020 | Schlemper et al. |
| 2020/0311926 A1 | 10/2020 | Tian et al. |
| 2021/0027436 A1 | 1/2021 | Banerjee et al. |
| 2022/0283253 A1 | 9/2022 | Sacolick et al. |

OTHER PUBLICATIONS

Moenninghoff C et al.: "Workflow Efficiency of Two 1.5T MR Scanners with And Without an Automated User Interface for Head Examinations". Acad Radiol. 2013; 20:721-730.
Stocker D. et al.; "Performance of an Automated Versus A Manual Whole-Body Magnetic Resonance Imaging workflow". Invest Radiol. 2018; 53:463-471.
Benhajali Y. et al.: "A Standardized Protocol for Efficient and Reliable Quality Control of Brain Registration in Functional MRI Studies". Frontiers in Neuroinformatics, 2020.
MAGNETOM Skyra; Producte Brochure, Siemens Healthcare GmbH, 58 pgs., 2018.
MNI152/ICBM2009C; The McConnell Brain Imaging Center, 4 pgs., Feb. 4, 2014.

\* cited by examiner

CONTROL UNIT, METHOD FOR OPERATING A CONTROL UNIT, MRT APPARATUS COMPRISING A CONTROL UNIT, COMPUTER PROGRAM AND ELECTRONICALLY READABLE DATA MEDIUM

CROSS-REFERENCE TO RELATED APPLICATIONS

The present application claims priority to and the benefit of European patent application no. EP 22211132.0, filed on Dec. 2, 2022, the contents of which are incorporated herein by reference in their entirety.

TECHNICAL FIELD

The present disclosure relates to a control unit, a method for operating a control unit and an MRT apparatus comprising a control unit. The disclosure is further directed to a corresponding computer program and an electronically readable data medium.

BACKGROUND

Consistent imaging in the examination of different objects by means of imaging methods, such as magnetic resonance tomography, for example, is advantageous for arriving at a high-quality diagnosis. This also applies to a series of multiple examinations conducted on an object by means of magnetic resonance tomography (MRT). In this case, MRT examinations are performed according to a particular predefined MRT protocol.

In medicine, the object that is to be examined may be a patient, for example. Maximum consistency in the imaging would be achieved if the MRT examinations were performed in accordance with the same MRT protocols. However, MRT protocol changes between routine MRT examinations are typical on account of different clinical requirements of the particular routine MRT examination and the individuality of the patients. Furthermore, MRT images of the respective routine MRT examinations can differ significantly from one another. This can be dependent for example on a position of the patient in the MRT apparatus during the respective routine MRT examination, a device model of the MRT apparatus, or a technique applied during the routine MRT examination.

Conventional automated workflows for conducting MRT examinations enable an adjustment of parameters of an MRT protocol for an MRT examination as a function of a condition of the patient or based on clinical requirements. At the same time, automated workflows enable more consistent and reproducible results. Compared to a manually adjusted MRT protocol for performing an MRT examination, the automated workflows ensure a quality of the MRT images that has already been rated good for MRT examinations in different regions.

Furthermore, the skills of an operator of the MRT apparatus or the cooperation of the patient also have a major effect on the resulting MRT images. For example, the MRT image can be detrimentally affected by irregular breathing, cardiac arrhythmias, and movements of the patient during the MRT measurement.

An automatic alignment of different MRT images on the basis of anatomical structures is an important step for an MRT-based group analysis. For example, voxel-based analysis of brain morphology generally requires an extremely accurate image registration of the respective MRT images. Furthermore, a quality control (QC) check is also important to guarantee a successful alignment of the MRT images from different MRT measurements.

In the publication by Benhajali et al. 2020 (Yassine Benhajali et al.: A Standardized Protocol for Efficient and Reliable Quality Control of Brain Registration in Functional MRI Studies. Frontiers in Neuroinformatics, 2020), a standardized method for visual quality control of the brain registration is proposed and evaluated on the basis of the reliability of the QC assessments. A registration between different MRT images is performed offline by means of a special brain registration tool in combination with a visual QC check. It was demonstrated that a lack of robustness of the registration is mainly due to differences in the image quality, the shape, and the cortical topology between the MRT images of the individual brains.

However, a visual check of the MRT images to ensure a robust registration of the MRT images is usually laborious and time-consuming. Moreover, an accuracy of the visual check of the MRT images is dependent on the rater conducting the check.

SUMMARY

It is an object of the present disclosure to address the aforementioned issues and to optimize the process of providing MRT images for a registration. This object is achieved by the various embodiments as described herein, including the claims.

A first aspect of the disclosure relates to a control unit.

The control unit is configured to receive a provisioning request for providing an MRT image of a geometric image region of an object, the provisioning request comprising a specification relating to at least one feature that is to be matched between an MRT reference image and the MRT image. In other words, the control unit is provided for the purpose of accepting the provisioning request. The control unit may for example comprise an interface and/or a user input device for receiving the provisioning request. The provisioning request is provided to initiate a provision of the MRT image by the control unit, the MRT reference image being used as a reference or template for the MRT image. In this case, the MRT image that is to be provided is intended to image the geometric image region of the object that is imaged in the MRT reference image. It can therefore be provided that an MRT apparatus is to be actuated and controlled by the control unit in such a way that the acquired MRT image images the same image region of the object as the MRT reference image.

A repeated acquisition of the same image region can be provided to deliver MRT images that are generated according to different MRT protocols in MRT examinations. Thus, for example, different information can be visualized in the MRT image than in the MRT reference image. It may also be provided that the same image region is examined according to an MRT protocol that is identical to the MRT protocol that was used for acquiring the MRT reference image. This can be provided for example when a change of the image region over time is to be examined.

The provisioning request for providing the MRT image comprises a specification relating to at least one feature that is to be matched between the MRT reference image of the image region and the MRT image. The feature that is to be matched can be a parameter of the MRT image that is to be identical or maximally similar to the corresponding feature of the MRT reference image. The control unit is accordingly instructed by way of the provisioning request to provide the MRT image that shows the same image region of the object as the MRT reference image. At the same time, the control unit is directed by means of the provisioning request to match the feature of the MRT image with the feature of the MRT reference image. By the matching it can be understood that the MRT image is to be provided in such a way that the feature of the MRT image is consistent with the feature of the MRT reference image or exhibits the smallest possible difference compared to the feature of the MRT reference image. The feature that is to be matched can relate for example to a spatial resolution of the MRT image. In this case, it can be provided for example that the spatial resolution that the MRT image is to have is to be matched with the spatial resolution of the MRT reference image so that the spatial resolutions are in agreement or as similar as possible.

The MRT reference image images the geometric image region of the object. The MRT reference image can be an MRT image, which can be generated from an MRT reference dataset. The MRT reference dataset may have been generated in an MRT examination conducted on the object by an MRT apparatus. The MRT examination can be performed in accordance with a specific MRT protocol. The MRT image can be a two-dimensional or three-dimensional image of the geometric image region of the object. The image region can be a predefined area or a predefined volume of the object, for example. The image region can also be a spatial image region related to an anatomy or structure of the object.

The control unit is configured to actuate and control an MRT apparatus according to the at least one specification in accordance with a predefined measurement method. The actuation is effected to perform a predefined MRT measurement at least on the geometric image region of the object. The MRT measurement can be performed in accordance with an MRT protocol, which can be specified for the MRT image. The MRT protocol for generating the MRT image can be different from the MRT protocol on the basis of which the MRT reference image was generated, or it can be identical to said protocol. The control unit is configured to receive an MRT dataset generated by the MRT apparatus in the MRT measurement. In other words, the control unit is configured to actuate and control the MRT apparatus so that the latter performs the predefined MRT measurement on the object. The control unit is configured to actuate and control the MRT apparatus in such a way that the latter acquires at least the geometric image region of the object in the predefined MRT measurement. For example, the control unit can be configured to perform a prescan of the object to generate a preliminary image of the object. The control unit can be configured to examine the preliminary image to localize the image region in the preliminary image and to actuate and control the MRT apparatus to acquire the localized image region. If the MRT reference image is a two-dimensional image, for example, and the prescan generates a three-dimensional preliminary image of the object, the control unit can for example identify a plane in the three-dimensional preliminary image that most closely matches the MRT reference image. The control unit can actuate and control the MRT apparatus as a function of the specification. This can mean that the said geometric image region is acquired by the MRT apparatus in the MRT measurement method in such a way that the geometric image region is acquired at the same spatial resolution as the MRT reference image, or at a spatial resolution which enables the MRT image to be provided at the spatial resolution. The MRT data acquired during the measurement can be provided by the MRT apparatus in an MRT dataset and be received by the control unit.

The control unit is configured to provide the MRT image of the geometric image region of the object generated from the MRT dataset according to the at least one specification in accordance with a predefined exporting method. In other words, the control unit is configured to evaluate the MRT dataset to generate the MRT image from the MRT dataset. The exporting method is performed on the MRT image according to the specification. It can be provided for example that the spatial resolution at which the image region was acquired is greater by an integral multiple than the spatial resolution according to the specification. The spatial resolution can be reduced accordingly in the exporting method so that the spatial resolution of the MRT image coincides with the spatial resolution of the MRT reference image.

The advantage that is produced as a result of the disclosure is that an MRT image can be provided which has a feature that is coordinated with an MRT reference image. Accordingly, the MRT image can be optimized for a registration method.

The control unit, which may alternatively be referred to herein as a controller or control circuitry, may comprise at least one computing unit. A computing unit may be implemented for example as a data processing device which contains a processing circuit. Thus, the computing unit may be alternatively referred to herein as one or more processors or processing circuitry, which may therefore process e.g. data for performing computational operations. If necessary, these may also include operations for performing indexed accesses to a data structure, such as a lookup table (LUT) for example.

The computing unit can e.g. contain one or more computers, one or more microcontrollers, and/or one or more integrated circuits, e.g. one or more application-specific integrated circuits (ASICs), one or more field-programmable gate arrays (FPGAs), and/or one or more single-chip systems (e.g. SoCs: system on a chip). The computing unit can also contain one or more processors, e.g. one or more microprocessors, one or more central processing units (CPUs), one or more graphics processing units (GPUs), and/or one or more signal processors, e.g. one or more digital signal processors (DSPs). The computing unit can also include a physical or virtual cluster of computers or other of the cited units.

In different exemplary embodiments, the computing unit contains one or more hardware and/or software interfaces and/or one or more memory units.

A memory unit, which may be alternatively referred to herein simply as a memory, can be embodied as a volatile data memory, for example as a dynamic random access memory (DRAM) or a static random access memory (SRAM), or as a non-volatile data memory, for example as a read-only memory (ROM), as a programmable read-only memory (PROM), as an erasable programmable read-only memory (EPROM), as an electrically erasable programmable read-only memory (EEPROM), as a flash memory or flash EEPROM, as a ferroelectric random access memory (FRAM), as a magnetoresistive random access memory (MRAM) or as a phase-change random access memory (PCRAM).

The disclosure also comprises developments by means of which further advantages are produced.

A development of the disclosure provides that the control unit is configured to transform the MRT image as a function of the MRT reference image in accordance with a predefined registration method. In other words, it is provided that the control unit is provided to align the MRT image to the MRT reference image by means of an application of the predefined registration method.

A development of the disclosure provides that the at least one feature to be matched comprises an alignment of the MRT image and the MRT reference image. In other words, the control unit is configured to match the alignment of the MRT image with the alignment of the MRT reference image. The control unit is therefore configured to provide the MRT image in such a way that the latter has the same alignment as the MRT reference image. The alignment can relate to a voxel grid, for example. It can be provided for example that the MRT image is provided in such a way that an alignment of the voxel grid in relation to the image region is consistent with the MRT reference image. The alignment can be provided for example by means of a corresponding execution of the MRT measurement operation and/or a performance of the exporting method. During the MRT measurement operation, the position of the voxels of the voxel grid for example can be adjusted accordingly so that the positions of the voxels of the MRT image coincide with the positions of the voxels of the MRT reference image or are approximated to these. During the exporting method, the MRT dataset can be interpolated for example in such a way that the MRT image has a correspondingly aligned voxel grid. The alignment to be matched can also relate to the MRT apparatus or to an anatomy of the object.

A development of the disclosure provides that the at least one feature that is to be matched comprises a spatial resolution of the MRT image and of the MRT reference image. In other words, the control unit is configured to match the spatial resolution of the MRT image with the spatial resolution of the MRT reference image. The control unit is therefore configured to provide the MRT image in such a way that the latter has the same spatial resolution as the MRT reference image. The spatial resolution can be set for example by an adjustment of the resolution for the acquisition of the MRT data in the MRT measurement operation. In addition or alternatively thereto, the MRT dataset can be correspondingly interpolated or reduced to provide the acquired MRT image with the spatial resolution.

A development of the disclosure provides that the at least one feature to be matched comprises a covering of the MRT image and the MRT reference image. In other words, the control unit is configured to match the covering of the MRT image with the covering of the MRT reference image. The covering can relate for example to a volume imaged in the MRT image or to an area imaged in the MRT image. The covering can also relate to sub-objects of the object that are imaged in the MRT image, such as organs, for example. It can be provided for example that the control unit is configured to actuate and control the MRT apparatus in such a way that it is ensured that a predefined organ identified in the MRT reference image is acquired in full by the MRT apparatus in the MRT measurement. Consequently, the MRT image can image the organ in its entirety. It can thus be ensured that the MRT image includes a necessary covering of the organ. An identical covering can also comprise a cropping of the MRT dataset during the exporting method so that a covering of the MRT image is not greater than a covering of the MRT reference image.

A development of the disclosure provides that the at least one feature to be matched comprises a position of at least one reference in the MRT image and the MRT reference image. In other words, the control unit is configured to output the MRT image in such a way that at least one reference in the MRT image has an identical position in the MRT image as in the MRT reference image. It can also be provided that multiple references are required to have identical positions in each case. A pixel coordinate can be designated with a position in relation to the MRT image, for example.

A development of the disclosure provides that the control unit is configured to determine at least one predefined quality feature of the MRT image in accordance with a predetermined quality determination method. In other words, the control unit is configured to determine a quality of the MRT image. In this case, the quality can be described in the at least one quality feature, which is determined in accordance with the predetermined quality determination method. The at least one quality feature can comprise for example a signal-to-noise ratio, an image contrast, a dynamic range or an image definition, etc. The quality determination method can comprise an image processing method, AI-based evaluations, or predefined algorithms. The quality feature can be dependent on the quality of the MRT image in terms of an image quality or on the content imaged by the MRT image. The latter can be evaluated for example taking into consideration a semantic segmentation and object detection and recognition methods.

A development of the disclosure provides that the control unit is configured to transform the MRT image in accordance with the predefined registration method only if a predefined quality criterion is met by the at least one quality feature of the MRT image. It can be provided for example that the quality criterion specifies that a signal-to-noise ratio of the MRT image is not exceeded. By this means, it can be ensured that only acquired MRT images having a satisfactory image quality are processed.

A development of the disclosure provides that the control unit is configured to determine at least one correction specification in a predefined correction method as a function of the at least one quality feature for the purpose of improving the quality feature. It can be provided for example that the control unit includes or accesses a database in which correction specifications are stored, and which comprises instructions to the MRT apparatus and/or human-readable instructions, which are fetched if a quality feature does not meet the quality criterion. It can be provided for example that the correction specification comprises an instruction for changing a position of the object, or a control command for reducing an acquisition time of the MRT measurement if motion artifacts were generated.

A second aspect of the disclosure relates to a method for operating a control unit.

A provisioning request for providing an MRT image of the geometric image region of the object is received by the control unit, the provisioning request comprising a specification relating to at least one feature that is to be matched between the MRT reference image and the MRT image. The MRT reference image images the geometric image region of the object.

An MRT apparatus is actuated and controlled by the control unit according to the at least one specification for the purpose of performing a predefined MRT measurement at least on the geometric image region of the object in accordance with a measurement method, and an MRT dataset generated in the measurement is received.

The MRT image of the geometric image region of the object is generated from the MRT dataset by the control unit according to the at least one specification in accordance with a predefined exporting method.

For application cases or application situations which can arise with the method and which are not explicitly described here, it can be provided according to the method that an error message and/or a request to input a user feedback response are/is output and/or a default setting and/or a predetermined initial state are/is set.

A third aspect of the disclosure relates to an MRT apparatus, which comprises at least one control unit according to the first aspect of the disclosure.

According to a fourth aspect, the disclosure also comprises a computer program comprising commands which, when the program is executed by a control unit, cause the control unit to perform the method according to the second aspect.

According to a fifth aspect of the disclosure, a computer-readable storage medium is disclosed which stores a computer program according to the fourth aspect of the disclosure.

The computer program and the computer-readable storage medium can be regarded as corresponding computer program products comprising the commands.

Further features of the disclosure will become apparent from the claims, the figures, and the description of the figures. The features and feature combinations cited above in the description, as well as the features and feature combinations cited below in the description of the figures and/or shown in the figures, can be encompassed by the disclosure not only in the combination disclosed in a given example but also in other combinations. For instance, embodiments and feature combinations that do not possess all the features of an originally formulated claim may also be included in the disclosure. Furthermore, embodiments and feature combinations which go beyond the feature combinations set forth in the back-references of the claims or diverge therefrom may be encompassed by the disclosure.

BRIEF DESCRIPTION OF THE DRAWINGS

The disclosure is explained in more detail below with reference to actual exemplary embodiments and associated schematic drawings. Like or functionally like elements may be labeled with the same reference signs in the figures. The description of like or functionally like elements may not necessarily be repeated in respect of different figures.

In the figures.

DETAILED DESCRIPTION OF THE DISCLOSURE

Figure 1:
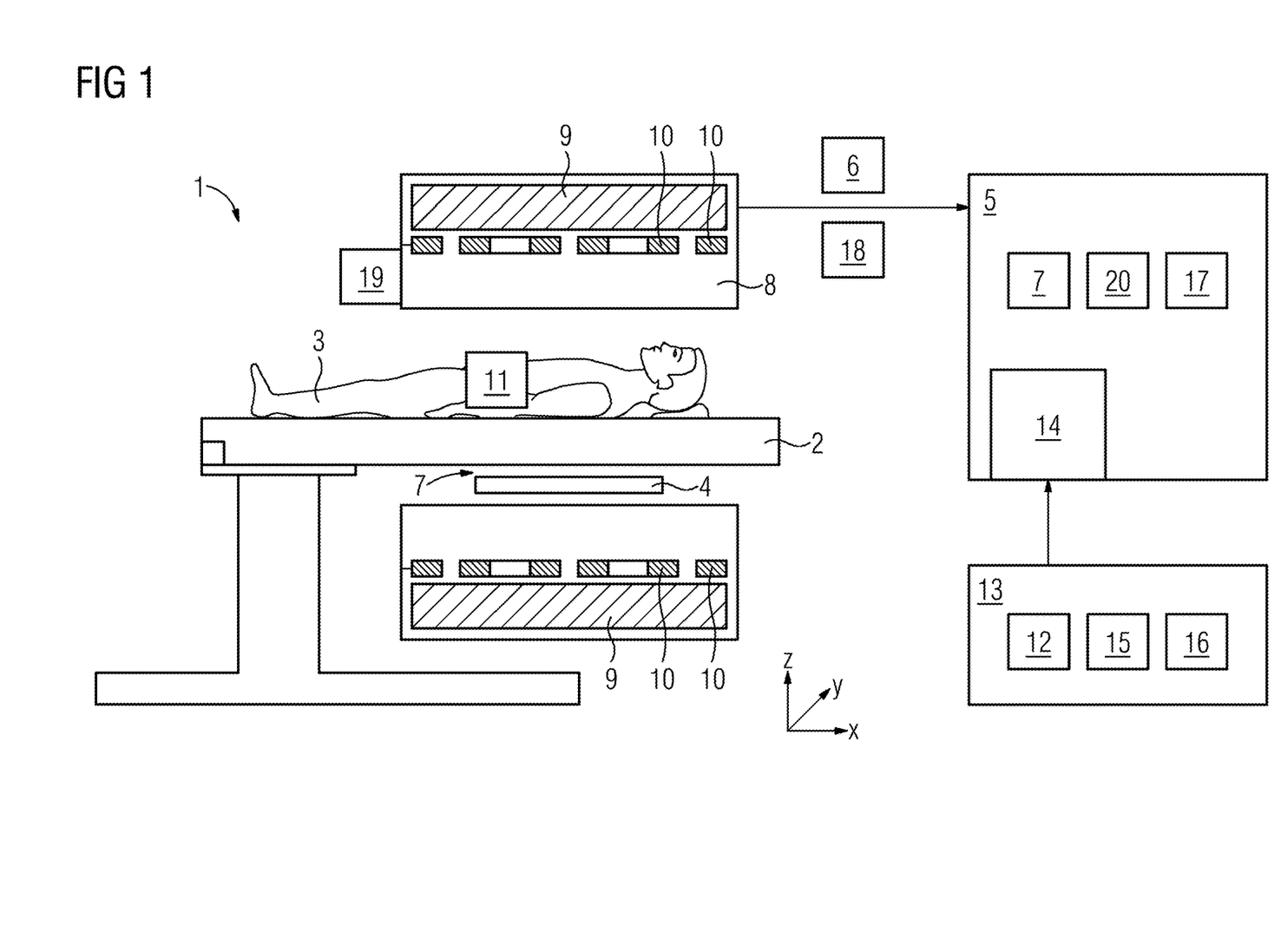
FIG. 1 illustrates a schematic representation of an example MRT apparatus which comprises a control unit.

FIG. 1 illustrates a schematic representation of an example MRT apparatus intended for magnetic resonance tomography.

The MRT apparatus 1 comprises an object support 2, which is embodied for example as a patient couch or patient table. An object 3 that is to be examined, for example a patient, can be arranged on the object support 2. The apparatus 1 additionally comprises a magnet unit 8, which has a field magnet 9 for generating a maximally homogeneous basic magnetic field, as well as one or more gradient coils 10 for generating spatially variable magnetic field gradients for spatially encoding corresponding MR signals.

The field magnet 9 is able to generate a static magnetic field for aligning the nuclear spins of the object 3 in a corresponding acquisition region. The acquisition region is characterized by an extremely homogeneous static magnetic field, the homogeneity relating in particular to the magnetic field strength or its absolute value. The field magnet 9 can comprise for example a superconducting magnet, which can provide magnetic fields with a magnetic flux density of up to 3 T, even higher in the case of more recent devices. For lower field strengths, however, permanent magnets or electromagnets having normally conducting coils can also find application.

To allow spatial differentiation of the acquired image regions 11 in the examination volume, the gradient coils 10 are configured to overlay the basic magnetic field, i.e. the static magnetic field generated by the field magnet 9, with variable magnetic fields in all three spatial directions to thereby realize the gradient. Typically, the gradient coils 10 can contain normally conducting coils which can generate fields orthogonal to one another.

The MRT apparatus 1 also comprises a receive coil unit 4 containing a receive coil, as well as a housing, for example. In this case, the receive coil can also function as a transmit coil, or the MRT apparatus 1 can have a separate transmit coil. A radiofrequency (RF) signal can be supplied via a signal line to the transmit coil to transmit corresponding signal pulses, e.g. into the object 3. The receive coil is configured to receive MR signals, also referred to as resonance signals, emitted from the object 3.

A control unit 5 of the MRT apparatus 1 supplies the magnet unit 8 with corresponding signals and evaluates the MR signals received from the receive coil. The control unit 5 can be configured to receive an MRT dataset 6 acquired by the MRT apparatus 1 during an MRT measurement to generate an MRT image 7 from the MRT dataset 6. It can be provided that the MRT image 7 is registered with at least one further MRT image 7 by the control unit 5 in accordance with a registration method. For this purpose, it may be advantageous to output the MRT image 7 in such a way that it has an identical alignment with the further MRT image 7. As reference, the control unit 5 can have an MRT reference image 20 available, which can image a previously acquired MRT image 7 of an image region 11 of the object 3. The control unit 5 can be configured to actuate and control the MRT apparatus 1 in such a way that the MRT dataset 6 enables an MRT image 7 to be generated, which images an image region 11 that is the same as the MRT reference image 20.

The control unit 5 can be configured to identify a position of the image region 11 in a prescan of the object 3 and to actuate and control the MRT apparatus 1 for the acquisition of the image region 11. In this case, a position of an acquisition plane for example can be specified accordingly in the MRT apparatus 1.

In order to enable a high-quality registration of the MRT images 7, the MRT apparatus 1 can be actuated and controlled in such a way that certain features 12 in the MRT reference image 20 and the MRT image 7 coincide. The features 12 may for example comprise a spatial resolution, a covering, or an alignment. The features 12 can be specified in a provisioning request 13 which can be received by the control unit 5. For this purpose, the control unit 5 can for example comprise an interface 14 for receiving signals and/or a user input point for acquiring predefined user inputs. The provisioning request 13 can also specify quality features 15 which are to be determined by the control unit 5 and which relate to the MRT image 7. Furthermore, the provisioning request 13 can specify a quality criterion 16 which must be met by the quality feature 15 in order for the MRT image 7 to be registered. In order to improve quality, the provisioning request 13 can specify that for the purpose of improving the quality feature, the control unit 5 determines and provides at least one correction specification as a function of the at least one quality feature in a predefined correction method.

The quality feature can also be determined as a function of at least one sensor value 18, which may have been captured by a sensor unit 19 of the MRT apparatus 1. The sensor value 18 may for example comprise a position of the object 3 determined by the sensor unit 19, or a detected movement of the object 3 in the MRT apparatus 1 during the MRT measurement.

The control unit 5 can evaluate the MRT dataset 6 according to the specifications in accordance with an exporting method to output the MRT image 7. The MRT image 7 can be transformed in accordance with a predefined registration method to match the MRT image 7 with the MRT reference image 20. A collection 17 of registered MRT images 7 can be provided as a result.

The receive coil unit 4 or the receive coil is not integrated into the object support 2 but is also not rigidly and immovably connected to the magnet unit 8. Instead, the receive coil is arranged in a vertical direction z underneath the object support 2 and displaceably mounted along the vertical direction z so that a distance between the receive coil and the object support 2 can be varied.

Figure 2:
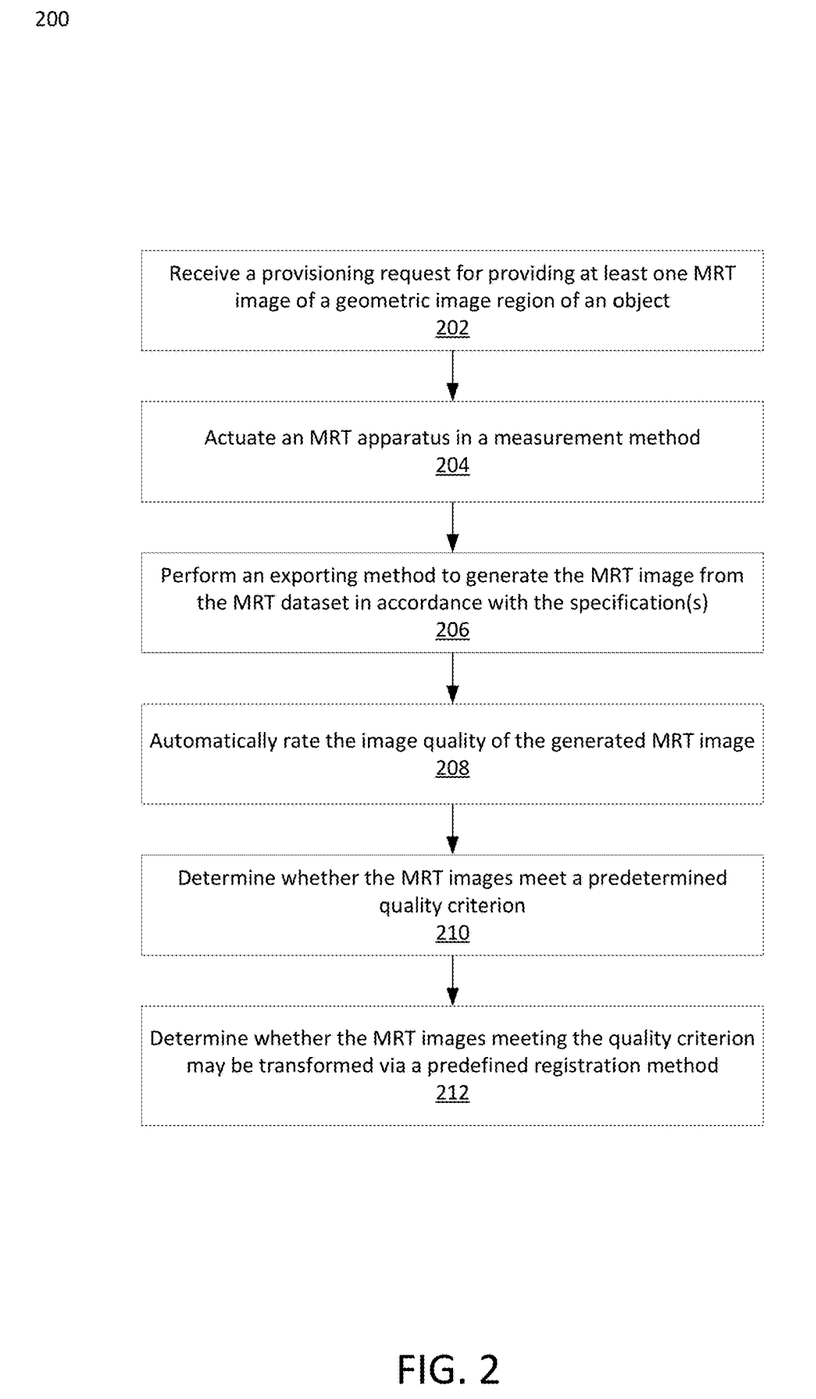
FIG. 2 illustrates a schematic representation of an example method for operating a control unit.

FIG. 2 illustrates a schematic representation of an example method for operating a control unit. The method 200 can be executed as a fully automatic workflow according to user-defined examination strategies. The method 200 can be performed via the control unit 5, for example. The method can enable MRT images 7 from MRT examinations to be matched according to different MRT protocols.

The method 200 comprises e.g. the control unit 5 receiving (block 202) a provisioning request 13 for providing at least one MRT image 7 of a geometric image region 11 of an object 3. The provisioning request 13 can comprise a specification of an MRT reference dataset, the MRT reference dataset comprising an MRT reference image 20 that images the geometric image region 11 of the object 3. The MRT reference image 20 can be a reference with which the at least one MRT image 7 that is to be provided is to be matched. A number of the MRT images 7 acquired according to respective MRT protocols can also be requested by means of the provisioning request 13.

In other words, it is provided in the method that the at least one MRT image 7 of the respective selected MRT protocol is aligned automatically. The MRT reference image, for example an earlier MRT image 7 of the patient who is to be examined, or a stereotaxic standard space such as the MNI152/ICBM2009C, can serve as reference for the alignment. The said template can be provided e.g. for brain studies.

The provisioning request 13 can comprise a specification relating to at least one feature 12 that is to be matched between the MRT reference image 20 and the at least one MRT image 7. In this case, the at least one feature 12 that is to be matched can be selected individually for the individual MRT images 7 if a number of the MRT images 7 are requested.

The at least one feature 12 that is to be matched can comprise an image alignment of the acquired MRT image, a position of the acquired MRT image, a covering of an anatomy that is to be visualized in the MRT image 7, or a resolution of the MRT image 7. The at least one feature 12 that is to be matched can be adapted to suit clinical requirements and a possible subsequent group analysis.

The matching can be performed by the control unit 5 in the following processes of the method 200 according to the predefined features 12.

The matching can be performed for example via a corresponding actuation (block 204) of the MRT apparatus 1 by e.g. the control unit 5 in a measurement method. It can be provided for example to perform an acquisition of a dataset for the purpose of generating a 3D MRT image 7 that is to be provided as a function of an alignment of a 2D MRT reference image in such a way that a main orientation of the 3D MRT image 7 that is to be provided is adjusted to fit a 2D orientation of the 2D MRT reference image. This results in the advantage that interpolation artifacts can be reduced during the generation of the 3D MRT image 7 in the exporting method.

The method 200 further comprises performing (block 206) an exporting method e.g. via the control unit 5 to generate the MRT image 7 from the MRT dataset 6 in accordance with the specifications. The exporting method can comprise a resolution adjustment to generate the MRT image 7 at a resolution different from a resolution of the dataset.

The method 200 further comprises, automatically rating (block 208) the image quality, e.g. via the control unit 5, on the basis of different quality features in accordance with a predefined quality determination method to ensure the robustness of the registration. The quality features 15 can relate to a signal-to-noise ratio, artifacts present, and/or motion artifacts present. The type of the artifacts may be classified if necessary. The evaluation of the at least one MRT image 7 in accordance with the predefined quality determination method can be carried out following completion of the entire study or after each individual provision of the respective MRT image 7. In the latter case, the results can be made available immediately to the user and the user can decide whether the study can be stopped and whether further measures are necessary.

The quality determination method may output an evaluation of the respective MRT images 7 by means of a quality feature, which indicates a reliability of the MRT images 7. This can be indicated using any suitable scale, such as e.g. a three-stage scale: good, acceptable, and poor. In addition, sensor values 18 such as motion messages, pilot tone signals, or physio signals from sensor units 19 may be incorporated into this evaluation. Furthermore, to achieve a more stable and more accurate assessment of the image quality, trained machine learning models may also be used on the basis of large volumes of data. The result of the analysis may also include a classification of the image artifacts. The result may indicate for example that a motion artifact has occurred, together with a probability of a respective classification if the artifact classification is specified in the provisioning request 13.

As part of the block 208, a correction specification may also be determined and output by the control unit 5. Acting in accordance with a predefined correction method, the control unit 5 may determine at least one correction specification as a function of the at least one quality feature 15 to improve the quality feature 15. The correction specification can describe how a following MRT measurement can be adjusted to be able to improve the at least one quality feature in future MRT images 7 compared to preceding MRT images 7. For example, in the event of an artifact being detected in the MRT image 7, the correction specification can suggest changes during the performance of the MRT measurement to avoid an occurrence of the artifact in the future MRT images 7.

Possible artifacts to be detected in MRT images 7 can include motion artifacts, coil problems, an incorrect positioning of the object 3, an incorrect field of view, flow artifacts, physiological irregularities due to breathing or a cardiac cycle, anatomical abnormalities, implants, metal artifacts, etc. Such a correction specification can be given on the basis of a subset of the MRT images 7 of the MRT protocols as soon as this is available. This means that the correction specification is not applied only after all the MRT images 7 of the respective MRT protocols have been acquired.

The method 200 further comprises determining (block 210) all the MRT images 7 on the basis of the respective quality features 15 to determine whether these meet a predefined quality criterion 16.

In other words, before the registration method is performed, all the MRT images 7 are automatically checked (block 210) by the control unit 5 for compliance with the quality criterion 16 to subsequently enable a high-quality registration of the MRT images 7. Compliance with the quality criterion 16, as well as the quality criterion 16, can be specified in the provisioning request 13 (block 202).

The method 200 further comprises determining (block 212) whether all the MRT images 7 (or at least the MRT images 7) that meet the quality criterion 16 can be transformed as a function of the MRT reference image 20 in accordance with a predefined registration method.

The MRT images 7 aligned in the method from said MRT protocols may then be more easily compared and checked to detect lesions, anatomical changes, or anomalies. Such MRT images 7 may be highlighted. Also, the matched MRT images 7 may be more easily used for matching with image acquisitions from other imaging methods, such as positron emission tomography (PET) or computed tomography (CT). The use of the MRT images 7 in treatment planning may be more easily possible as a result. In order to facilitate this, it can be provided that the reference image 20 may also be an image, which can be generated according to a different imaging method than magnetic resonance tomography. It can be provided for example that the reference image 20 may have been generated by means of positron emission tomography or computed tomography.

Figure 3:
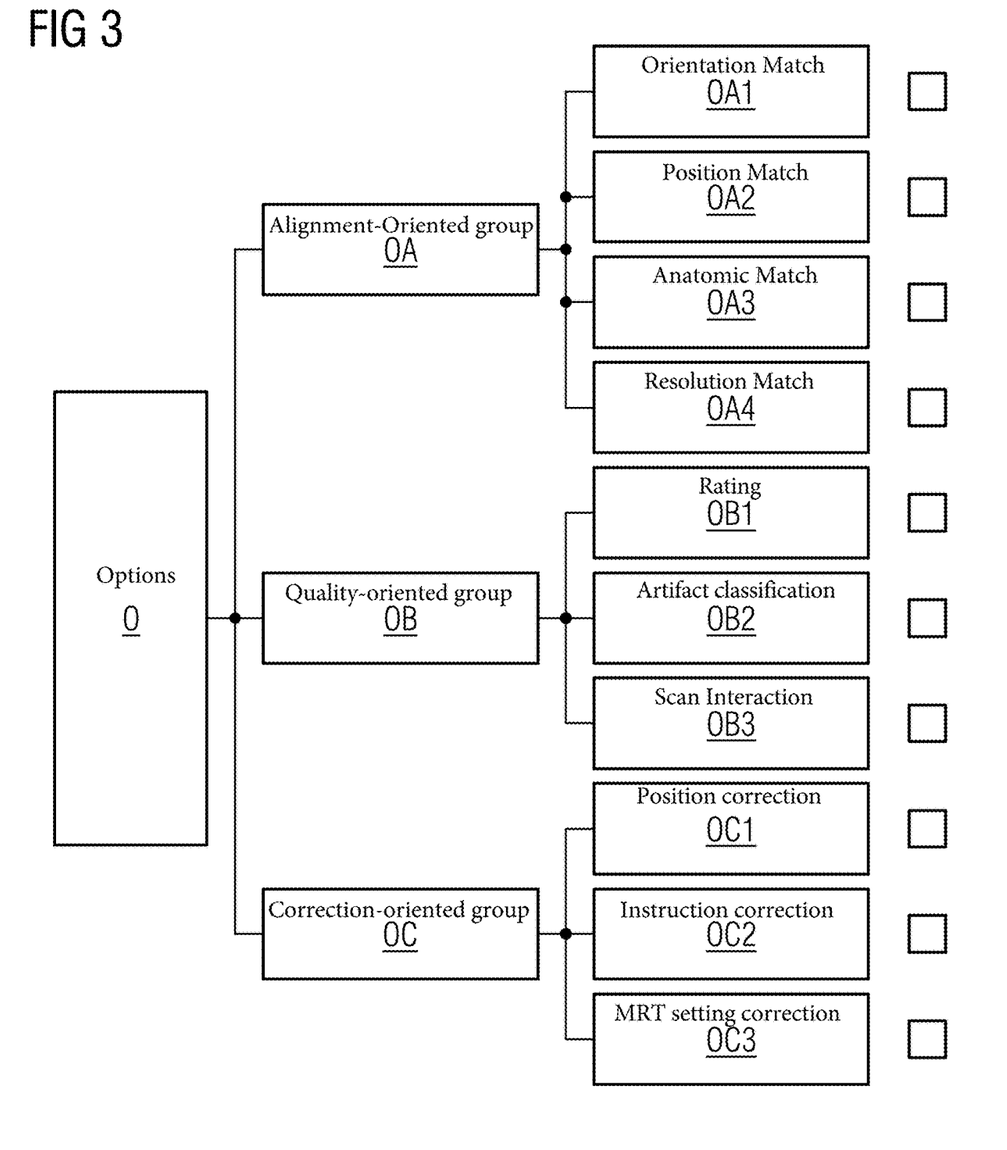
FIG. 3 illustrates a schematic representation of potential an example processes for operating a control unit.

FIG. 3 illustrates a schematic representation of potential an example processes for operating a control unit.

There follows an example outline of options, which can be provided by the control unit 5 for use in a method. The options to be taken into consideration in the method can be selected by a user in the provisioning request 13. The options can be specified by the user prior to an initiation of a first MRT examination on the basis of the needs of the technologist or radiologist.

The control unit 5 can include an interface 14, which can comprise a central user interface and/or a data interface. The user interface can enable the respective options O for the MRT images 7 that are to be provided to be selected from the respective MRT protocols.

The options O can be organized e.g. according to groups as follows.

An alignment-oriented group OA may comprise specifications in respect of the alignment of the respective MRT image 7 in relation to the MRT reference image. For example, the specifications can comprise a matching of an orientation "Orientation Match" (OA1), a matching of a position "Position Match" (OA2), a matching of a covering "Anatomic Match" (OA3), and a matching of a spatial resolution "Resolution Match" (OA4).

A quality-oriented group OB may comprise a performance of an evaluation of the MRT image 7 "Rating" (OB1) as an option. In this case, at least one quality feature can be set. The quality-oriented group OB may comprise an artifact classification (OB2) for determining a type of an artifact identified in the MRT image 7 as an option, as well as a determination of a "Scan Interaction" (OB3).

A correction-oriented group OC may comprise options which relate to a determination and output of the correction specifications to improve the quality feature of the MRT image 7. These options may comprise a determination of correction specifications in respect of a position (OC1) of the object 3, in respect of an instruction to a patient (OC2), or in respect of a setting of the MRT apparatus 1 (OC3).

The alignment may be realized prospectively by automatic adjustment of the MRT protocol alignment or retrospectively by registration and/or interpolation in order to adjust the resolution.

Figure 4:
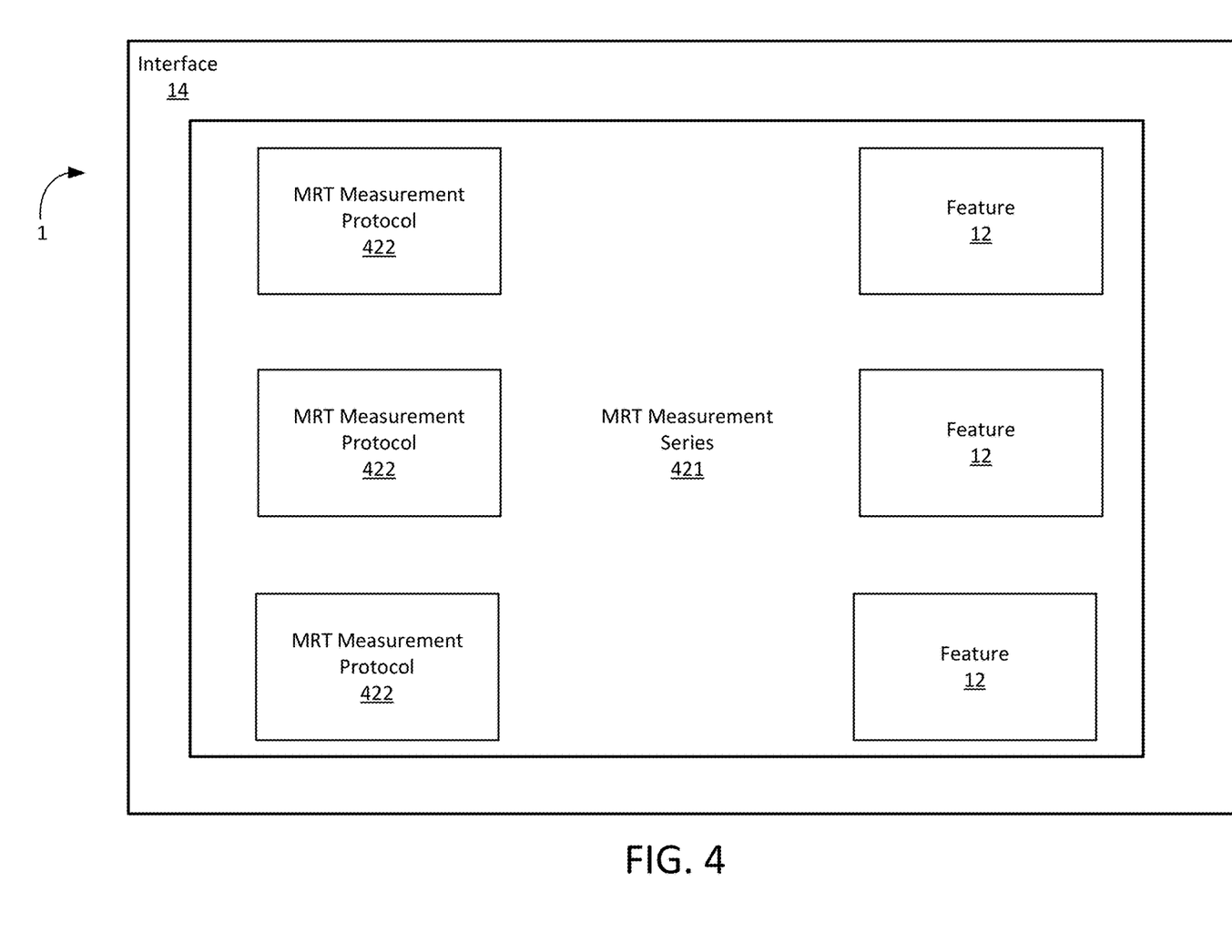
FIG. 4 illustrates a schematic representation of an example interface of a control unit.

FIG. 4 illustrates a schematic representation of an example interface of a control unit.

The interface 14 of the MRT apparatus 1 shows a list of MRT protocols, wherein the respective MRT measurement protocols 422 of an MRT measurement series 421 can be assigned the features 12 that are to be coordinated.

A combined matching of images from different MRT protocols 2D and 3D of a particular study should facilitate a better consistency check, a speedier diagnosis, and the following group analyses.

A well-focused study could be more easily correlated with other modalities CT or PET in the image fusion step or for treatment planning.

An online method for checking the image quality could subsequently allow a high-quality image registration and provide a useful interaction mode in which the users are able to decide whether the scan is to be stopped and whether further measures are necessary in the meantime.

A recommendation for avoiding artifacts in a subsequent scan could be given, e.g. the type of the artifacts could be classified, e.g. into motion artifacts, coil problems, incorrect positioning, incorrect FOV, flow artifacts, physiological irregularities due to breathing or cardiac cycle, anatomical challenges, implants, metal artifacts, tattoos, make-up, metal parts in clothing, etc.

It is noted that irrespective of the grammatical gender of a particular term, individuals having male, female or other gender identity are also included.

The various components described herein may be referred to as "units." Such components may be implemented via any suitable combination of hardware and/or software components as applicable and/or known to achieve their intended respective functionality. This may include mechanical and/or electrical components, processors, processing circuitry, or other suitable hardware components, in addition to or instead of those discussed herein. Such components may be configured to operate independently, or configured to execute instructions or computer programs that are stored on a suitable computer-readable medium. Regardless of the particular implementation, such units, as applicable and relevant, may alternatively be referred to herein as "circuitry," "controllers," "processors," or "processing circuitry," or alternatively as noted herein.

What is claimed is:

1. A controller, comprising:
a data interface configured to receive a provisioning request for providing a magnetic resonance tomography (MRT) image of a geometric image region of an object,
wherein the provisioning request comprises a specification relating to a feature that is to be matched between an MRT reference image of the geometric image region of the object and the MRT image; and
processing circuitry configured to:
actuate and control, in accordance with a predefined measurement method, an MRT apparatus based upon the specification to perform a predefined MRT measurement on the geometric image region of the object;
receive an MRT dataset generated via the predefined MRT measurement; and
generate, based upon the MRT dataset and via a predefined exporting method, the MRT image of the geometric image region of the object according to the specification by selectively transforming the MRT image as a function of the MRT reference image to register the MRT reference image and the MRT image with one another.

2. A method for operating a controller of a magnetic resonance tomography (MRT) apparatus, the method comprising:
receiving a provisioning request for providing an MRT image of a geometric image region of an object,
wherein the provisioning request comprises a specification relating to a feature that is to be matched between an MRT reference image of the geometric image region of the object and the MRT image;
actuating and controlling the MRT apparatus in accordance with a measurement method based upon the specification to perform a predefined MRT measurement on the geometric image region of the object;
receiving an MRT dataset that is generated in the predefined MRT measurement; and
generating the MRT image of the geometric image region of the object based upon the MRT dataset and according to the specification via a predefined exporting method by selectively transforming the MRT image as a function of the MRT reference image to register the MRT reference image and the MRT image with one another.

3. A non-transitory electronically readable data medium configured to store electronically readable control information that, when executed by a controller of a magnetic resonance tomography (MRT) apparatus, cause the MRT to:
receive a provisioning request for providing an MRT image of a geometric image region of an object,
wherein the provisioning request comprises a specification relating to a feature that is to be matched between an MRT reference image of the geometric image region of the object and the MRT image;
actuate and control the MRT apparatus in accordance with a measurement method based upon the specification to perform a predefined MRT measurement on the geometric image region of the object;
receive an MRT dataset that is generated in the predefined MRT measurement; and
generate the MRT image of the geometric image region of the object based upon the MRT dataset and according to the specification via a predefined exporting method by selectively transforming the MRT image as a function of the MRT reference image to register the MRT reference image and the MRT image with one another.

4. The controller as claimed in claim 1, wherein the feature that is to be matched comprises an alignment of the MRT image with an alignment of the MRT image with respect to a predefined reference system.

5. The controller as claimed in claim 1, wherein the feature that is to be matched comprises a spatial resolution of the MRT image with a spatial resolution of the MRT reference image.

6. The controller as claimed in claim 1, wherein the feature that is to be matched comprises a covering of the MRT image with a covering of the MRT reference image.

7. The controller as claimed in claim 1, wherein the feature that is to be matched comprises a position of a predefined reference in the MRT image with the position of a predefined reference in the MRT reference image.

8. The controller as claimed in claim 1, wherein the processing circuitry is configured to determine a predefined quality feature of the MRT image in accordance with a predetermined quality determination method.

9. The controller as claimed in claim 1, wherein the controller is part of the MRT apparatus.

10. The controller as claimed in claim 1, wherein a spatial resolution of the generated MRT image is greater, by an integral multiple, than a spatial resolution according to the specification.

11. The controller as claimed in claim 1, wherein the processing circuitry is configured to generate the MRT image of the geometric image region of the object by reducing, via the predefined exporting method, a spatial resolution of the MRT image to match a spatial resolution of the MRT reference image.

12. The controller as claimed in claim 1, wherein the processing circuitry is configured to selectively transform the MRT image as a function of the MRT reference image to register the MRT reference image and the MRT image with one another via an alignment of a voxel grid between the MRT image and the MRT reference image.

13. The controller as claimed in claim 1, wherein the processing circuitry is configured to selectively transform the MRT image as a function of the MRT reference image to register the MRT reference image and the MRT image with one another by interpolating the MRT dataset such that the MRT image has a voxel grid that is aligned with that a voxel grid of the MRT reference image.

14. The controller as claimed in claim 1, wherein:
the MRT reference image comprises a two-dimensional image,
the MRT image comprises a three-dimensional image, and
the feature that is to be matched comprises a plane in the MRT image that is to be matched to the MRT reference image.

15. The controller as claimed in claim 8, wherein the processing circuitry is configured to transform the MRT image in accordance with a predefined the registration method only when a predefined quality criterion is met by the predefined quality feature of the MRT image.

16. The controller as claimed in claim 8, wherein the processing circuitry is configured to determine, via a predefined correction method as a function of the predefined quality feature, a correction specification for adjusting the quality feature such that the quality feature meets a predefined quality criterion.

17. The controller as claimed in claim 15, wherein the predefined quality criterion comprises a signal-to-noise ratio, an image contrast, or a dynamic range.

\* \* \* \* \*